United States Patent [19]

Gottlieb

[11] 4,399,321

[45] Aug. 16, 1983

[54] HIGH CAPACITANCE BUS BAR INCLUDING MULTILAYER CERAMIC CAPACITORS

[75] Inventor: Michael M. Gottlieb, Kraainem, Belgium

[73] Assignee: Rogers Corporation, Rogers, Conn.

[21] Appl. No.: 249,641

[22] Filed: Mar. 31, 1981

[51] Int. Cl.³ .............................................. H01B 7/00
[52] U.S. Cl. ..................................... 174/72 B; 29/854
[58] Field of Search ................. 174/68 B, 70 B, 72 B; 29/825, 854, 855, 856, 25.42; 361/321, 328, 329, 330

[56] References Cited

U.S. PATENT DOCUMENTS 4,266,091  5/1981  Fukuda .............................. 174/72 B

*Primary Examiner*—Laramie E. Askin
*Attorney, Agent, or Firm*—David S. Fishman

[57] ABSTRACT

A miniaturized bus bar and the method of production thereof wherein a sheet of insulating material is laminated between a pair of bus conductors and windows are provided in the laminated structure. A plurality of multilayer ceramic capacitors are inserted in the windows and alternate plates of the capacitors are electrically connected to the two bus conductors. The capacitors are comprised of alternating layers of conductive material and dielectric material.

6 Claims, 4 Drawing Figures

HIGH CAPACITANCE BUS BAR INCLUDING MULTILAYER CERAMIC CAPACITORS

BACKGROUND OF THE INVENTION (1) Field of the Invention

This invention relates to bus bars and particularly to miniature bus bars characterized by a high capacitance. More especially, this invention relates to the manufacture of bus bars which incorporate multilayer capacitive elements between pairs of elongated parallel bus conductors. Accordingly, the general objects of the present invention are to provide novel and improved articles and methods of such character.

(2) Description of the Prior Art

Conventional bus bars of relatively small or miniature size have been known in the art for a number of years. Such bus bar devices are used for power and/or signal distribution in many systems, such as, for example, computer back panels and integrated circuit systems. Such prior art multilayer bus bars comprise at least two conductive plates (usually in the form of elongated strips or bars of copper) separated by an insulating film. A typical prior art bus bar of this type may use copper conductors having a thickness of about 10 mils, and the overall dimensions of the bus bar may be from about 0.019 to 0.120 inch thick, from about 0.150 to 0.200 inch wide and range in length up to about 16 inches. Typically, the separating insulating layer is a plastic dielectric film such as the polyester material known as MYLAR. The MYLAR separator layer and the conductive plates are bonded together by an adhesive. Conventional prior art bus bars of this type have relatively low capacitance which results in the devices being comparatively ineffective in attenuating high frequency noise. This high frequency noise is highly undesirable, especially when the bus bar is used for signal distribution.

One prior art approach to eliminating this noise problem involves connecting capacitors to the bus bar after the completion of the bus bar assembly. While this approach raised the capacitance and minimized the noise, it resulted in additional expense and time in manufacturing.

Another type of bus bar structure disclosed in the prior art involves disposing discrete high capacitive elements between a pair of conductors. These bus bars have the desired high capacitance. Examples of such high capacitance bus bars are disclosed in U.S. Pat. Nos. 4,236,038 and 4,236,046 and in patent application Ser. No. 950,266, filed Oct. 10, 1978, now U.S. Pat. No. 4,266,901, all of which are owned by the assignee of the present invention. The high capacitive elements utilized in those inventions are thin layers or chips of dielectric material, usually a ceramic with a high dielectric constant. The opposing surfaces of the chips are typically coated with a thin, integral and continuous film of conductive material and these conductive films are electrically connected to respective ones of the bus conductors.

SUMMARY OF THE INVENTION

The present invention provides a novel and improved construction of a miniaturized bus bar assembly and methods for the fabrication thereof.

In accordance with the present invention, multilayer ceramic capacitors are inserted in openings provided in a conventional bus bar structure. These capacitors have, in addition to parallel plates, transverse end plates which are connected to alternate plates within the dielectric. The transverse end plates of the capacitors are each electrically connected to a different one of the bus conductors to obtain the desired high capacitance between the bus bar conductors.

Accordingly, the present invention has among its objects, the provision of a novel high capacitance bus bar and methods of producing such bus bars.

BRIEF DESCRIPTION OF THE DRAWINGS

Referring to the drawings, wherein like elements are numbered alike in the several FIGURES.

DESCRIPTION OF THE PREFERRED EMBODIMENT

Figure 1:
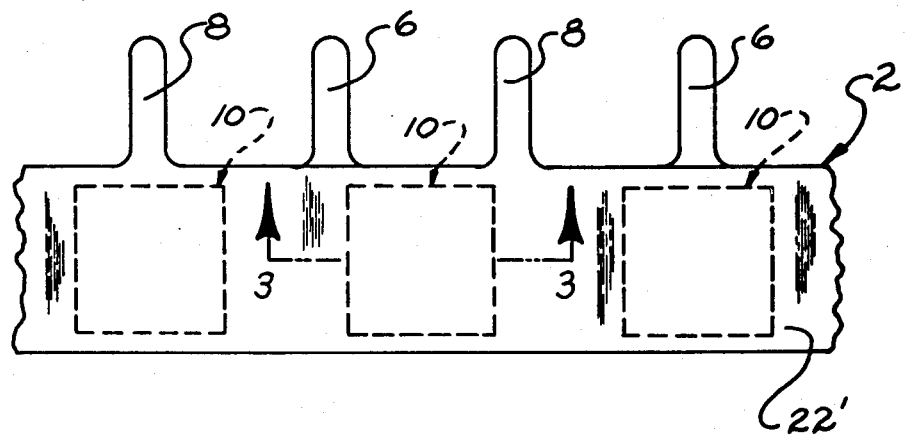
FIG. 1 is a partial top plan view of a bus bar incorporating the present invention.

Referring to FIG. 1, a portion of a miniature bus bar in accordance with the present invention is indicated generally at 2. The bus bar includes a pair of elongated parallel bus conductors 22 and 22' (FIGS. 3 and 4) from which project signal distribution pins or fingers 6 and 8, respectively. A plurality of multilayer capacitor elements 10 are included within bus bar 2 between the two bus conductors as will be described in more detail hereinafter.

Figure 2:
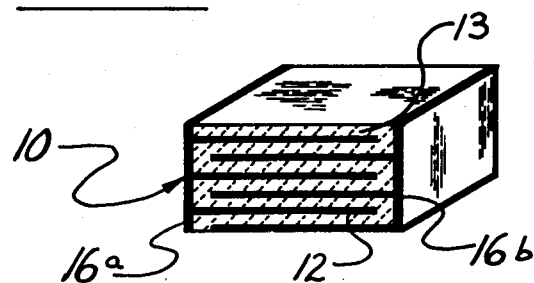
FIG. 2 is an enlarged perspective view of one embodiment of a multilayer capacitance element for incorporation in the bus bar of FIG. 1.

Referring to FIG. 2, a multilayer capacitor element for use in the present invention is indicated generally at 10. Element 10 is constructed of a series of conductive layers 12 separated by layers 13 of a material having a high dielectric constant. The dielectric material will, in accordance with the preferred embodiment, be a ceramic such as barium titanate. Each conductive layer 12 has only one of its ends exposed at a side of element 10, with alternate conductive layers 12 having exposed ends at the same side of element 10. The pair of opposed side faces of element 10 to which conductive layers 12 extend are metallized whereby conductive end plates 16a and 16b are defined; the groups of alternating conductive layers 12 being in electrical contact with end plates 16a and 16b.

The multilayer capacitor elements 10 may be formed by coating portions of the opposing surfaces of chips or wafers of the ceramic dielectric with a conductive material, such as silver or a conductive adhesive, and then assembling several such layers in a multilayer array. Conductive end plates 16a and 16b may also be comprised of silver or a conductive adhesive. Alternatively, the multilayer capacitor elements may be formed by imbedding thin sheets of conductive material in the dielectric material, with alternate sheets of conductive material being connected to end plates 16a and 16b of the same conductive material. Multilayer capacitor elements of the type described are commercially available from AVX Ceramics Corp. of Myrtle Beach, S.C.

Figure 3:
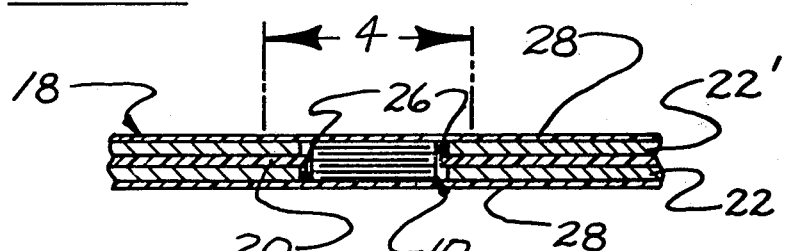
FIG. 3 is a cross-sectional side elevation view taken along line 3—3 of FIG. 1.
Figure 4:
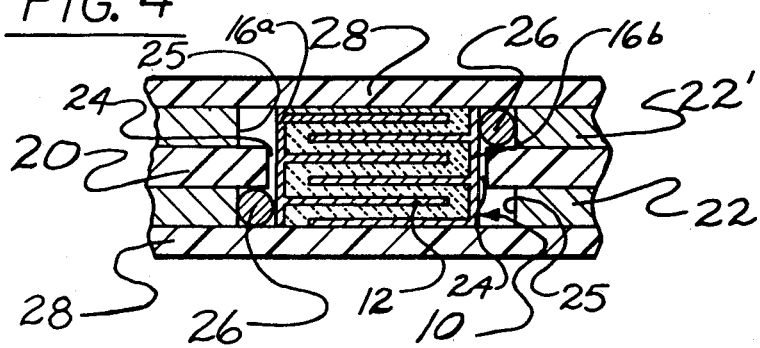
FIG. 4 is an enlargement of portion 4 of the device shown in FIG. 3.

Referring now to FIGS. 3 and 4, a portion of a bus bar in accordance with the present invention is generally indicated at 18. Bus bar 18 includes an insulating layer 20, such as a sheet of Mylar (which is a polyester), laminated between a pair of bus conductors 22 and 22'.

This laminate is provided with openings 24 which define windows or pockets. Openings 24 are of the same shape as and are slightly larger than multilayer capacitor elements 10. A capacitor element 10 is positioned within each opening 24 and is spaced from the bus conductors 22 and 22' so that there is no inadvertant or undesired contact between the elements 10 and the bus conductors. To assist in preventing any undesirable contact between the elements 10 and the bus conductors, the perimeter of the openings 24 in insulating layer 20 may be smaller than the corresponding openings in the conductors 22 and 22' to insure that the multilayer capacitor elements 10 remain spaced from conductors 22 and 22' by a substantially equal distance in all directions.

Of particular importance is the fact that the end plates 16a and 16b are spaced from the ends 25 of conductors 22 and 22' which define part of the sides of the openings 24. The desired internal capacitance of the bus bar assembly is achieved by establishing selective contact between end plates 16a and 16b and the bus conductors 22 and 22'. To that end, each of the end plates 16a and 16b is connected to a different one of the conductors 22 and 22'. Thus, by way of illustration, end plate 16a is connected to conductor 22 and end plate 16b is connected to conductor 22' (see FIG. 4). The connection between end plates 16a and 16b and conductors 22 and 22' is by means of any suitable conductive connection 26 which may be solder, conductive adhesive, etc., as long as care is taken to insure that each end plate 16a and 16b is connected to only one bus conductor. The electrical connections 26 may also be relied upon to mechanically attach the multilayer capacitor elements 10 in position in the assembly; or the elements 10 may be mechanically positioned in any other desired manner.

Each bus conductor 22 and 22' may also have an outer insulating plastic layer 28, or the entire bus bar assembly may be encapsulated in such insulating plastic.

Each multilayer capacitor element will be connected as described above so that its opposite end plates are respectively connected to separate ones of the bus conductors which are generally transversely oriented with respect to the said end plates. In this manner, internal capacitance is established along the entire length of the bus bar assembly.

The bus conductors of the present invention are copper elements, which may be tin plated; and they are approximately 10 mils thick and range in width or height from about 0.150 to about 0.200 inch and range in length from about 2 to 16 inches, depending on the particular application for the bus bar. The ceramic material, from which the multilayer capacitive elements or strip capacitors are formed preferably has a relatively high dielectric constant, a dielectric constant in excess of 8,000 for example, and the thickness of the dielectric material may range from about 0.005 inch to about 0.015 inch. The capacitor elements will typically have opposed face surface dimensions, measured parallel to the planes defined by the bus conductors, in the range of from about 0.2 inch by 0.2 inch to about 0.2 inch by 3.0 inches for individual elements or the multilayer capacitors may extend for the length of the bus bar assembly if in the form of ribbon capacitors.

While preferred embodiments have been shown or described, various modifications and substitutions may be made thereto without departing from the spirit and scope of the invention. Accordingly, it is to be understood that the present invention has been described by way of illustration and not limitation.

What is claimed is:

1. A bus bar assembly comprising:
    insulating means, said insulating means being comprised of a flat elongated strip of non-conductive material having oppositely disposed first and second faces, said insulating means being provided with at least a first aperture extending therethrough between said faces;
    a first bus bar conductor, said first bus bar conductor being bonded to said first face of said insulating means, said first bus bar conductor being provided with at least a first aperture which extends therethrough, said first bus bar aperture being in registration with said first aperture of said insulating means;
    a second bus bar conductor, said second bus bar conductor being bonded to said second face of said insulating means, said second bus bar conductor being provided with at least a first aperture which extends therethrough, said second bus bar aperture being in registration with said first aperture of said insulating means;
    said registered apertures of said first and second bus bar conductors having a larger cross-sectional area than the aperture in said insulating means;
    at least first multilayer capacitor means, said multilayer capacitor means being comprised of a dielectric material having a high dielectric constant, said capacitor means having a plurality of spaced end layers of conductive material on a first pair of oppositely disposed faces of said capacitor means, said capacitor means being positioned within said registered apertures of said insulating means and said first and second bus bar conductors with said end layers of conductive material being oriented substantially transverse to said insulating means first and second faces;
    first means electrically connecting one of the conductive end layers of said capacitor means to said first bus bar conductor; and
    second means electrically connecting the other of the conductive end layers of said capacitor means to said second bus bar conductor.

2. The bus bar assembly of claim 1 wherein said capacitor means includes spaced conductive layers, said spaced conductive layers being arranged generally transversely with respect to said end layers, the alternate ones of said spaced conductive layers being electrically connected to opposite ones of said end layers and being spaced from said bus bar conductors.

3. The apparatus of claim 2 wherein said spaced conductive layers are embedded in said dielectric material.

4. The bus bar assembly of claim 1 wherein said first and said second electrical connecting means is solder.

5. The bus bar assembly of claim 1 wherein said first and said second electrical connecting means is conductive adhesive.

6. The bus bar assembly of claim 1 further including:
    sheath means, said sheath means being non-conductive, said sheath means encapsulating said first and said second bus bar conductors and said capacitor means.

* * * * *